US012695007B2

(12) United States Patent
Arai et al.

(10) Patent No.: US 12,695,007 B2
(45) Date of Patent: Jul. 28, 2026

(54) COMPRESSED STRANDED CONDUCTOR, METHOD OF MANUFACTURING COMPRESSED STRANDED CONDUCTOR, INSULATED ELECTRIC WIRE, AND WIRE HARNESS

(71) Applicant: YAZAKI CORPORATION, Tokyo (JP)

(72) Inventors: Shuntaro Arai, Susono (JP); Daigo Matsuura, Susono (JP); Satoru Yoshinaga, Susono (JP); Tomomi Hirota, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 300 days.

(21) Appl. No.: 18/424,703

(22) Filed: Jan. 26, 2024

(65) Prior Publication Data

US 2024/0212886 A1 Jun. 27, 2024

Related U.S. Application Data

(62) Division of application No. 17/458,555, filed on Aug. 27, 2021, now Pat. No. 11,984,239.

(30) Foreign Application Priority Data

Aug. 28, 2020 (JP) ................................ 2020-144164

(51) Int. Cl.

| | |
|---|---|
| ***H01B 13/02*** | (2006.01) |
| ***B21D 39/04*** | (2006.01) |
| ***H01B 13/00*** | (2006.01) |

(52) U.S. Cl.

CPC ....... *H01B 13/0207* (2013.01); *B21D 39/048* (2013.01); *H01B 13/0006* (2013.01); *H01B 13/0285* (2013.01); *H01B 13/0292* (2013.01)

(58) Field of Classification Search

CPC ... B21F 5/005; H01B 13/0006; H01B 13/227; H01B 13/228

See application file for complete search history.

(56) References Cited

U.S. PATENT DOCUMENTS 4,471,161 A * 9/1984 Drummond ............. D07B 3/10 57/213

FOREIGN PATENT DOCUMENTS

JP 2012-43720 A 3/2012

* cited by examiner

*Primary Examiner* — Debra M Sullivan

(74) *Attorney, Agent, or Firm* — KENEALY VAIDYA LLP

(57) ABSTRACT

A compressed stranded conductor includes a central stranded wire having a plurality of conductive strands which are twisted together and an outer circumferential stranded wire having a plurality of conductive strands which are twisted together at an outer circumference of the central stranded wire. A composite stranded wire configured by the central stranded wire and the outer circumferential stranded wire is compressed, and an occupancy ratio of the composite stranded wire is 90.2% or more and 91.0% or less.

1 Claim, 5 Drawing Sheets

| CHEMICAL COMPONENT (mass%) | | | | | CHARACTERISTICS | |
|---|---|---|---|---|---|---|
| Si | Fe | Mg | Zr | Ti | STRENGTH (MPa) | ELONGATION (%) |
| ≦0.10 | 0.55∼0.65 | 0.28∼0.32 | 0.005∼0.01 | ≦0.02 | 250∼320 | 1∼3 |

FIG. 6

| | INNER LAYER STRAND DIAMETER (mm) | INNER LAYER COMPRESSION DIE DIAMETER (mm) | HOLE AREA OF INNER LAYER COMPRESSION DIE ($mm^2$) | INNER LAYER CONDUCTOR CROSS-SECTIONAL AREA AFTER COMPRESSION ($mm^2$) | INNER LAYER OCCU-PANCY RATIO (%) | FINAL OCCU-PANCY RATIO (%) | TWISTING STATE | REMARKS |
|---|---|---|---|---|---|---|---|---|
| COMPARATIVE EXAMPLE 1 | 0.303 | 0.49 | 0.189 | 0.167 | 88.5 | 90.1 | × | BREAKAGE DUE TO OVER-COMPRESSION STRAND INVERSION |
| EXAMPLE 1 | 0.303 | 0.5 | 0.196 | 0.172 | 87.7 | 90.4 | ○ | EXCELLENT |
| EXAMPLE 2 | 0.303 | 0.51 | 0.204 | 0.177 | 86.9 | 90.8 | ○ | EXCELLENT |
| EXAMPLE 3 | 0.313 | 0.53 | 0.221 | 0.191 | 86.5 | 91.0 | ○ | EXCELLENT |
| EXAMPLE 4 | 0.303 | 0.52 | 0.212 | 0.182 | 85.5 | 90.2 | ○ | EXCELLENT |
| EXAMPLE 5 | 0.322 | 0.56 | 0.246 | 0.209 | 84.9 | 91.0 | ○ | EXCELLENT |
| EXAMPLE 6 | 0.303 | 0.53 | 0.221 | 0.186 | 84.2 | 91.0 | ○ | EXCELLENT |

FIG. 7

| | INNER LAYER STRAND DIAMETER (mm) | INNER LAYER COMPRESSION DIE DIAMETER (mm) | HOLE AREA OF INNER LAYER COMPRESSION DIE ($mm^2$) | INNER LAYER CONDUCTOR CROSS-SECTIONAL AREA AFTER COMPRESSION ($mm^2$) | INNER LAYER OCCU-PANCY RATIO (%) | FINAL OCCU-PANCY RATIO (%) | TWISTING STATE | REMARKS |
|---|---|---|---|---|---|---|---|---|
| COMPARATIVE EXAMPLE 2 | 0.313 | 0.55 | 0.238 | 0.199 | 83.7 | 91.6 | × | STRAND INVERSION BREAKAGE DUE TO OVER-COMPRESSION |
| COMPARATIVE EXAMPLE 3 | 0.303 | 0.54 | 0.229 | 0.190 | 82.8 | 91.2 | × | STRAND INVERSION BREAKAGE DUE TO OVER-COMPRESSION |
| COMPARATIVE EXAMPLE 4 | 0.313 | 0.56 | 0.246 | 0.202 | 82.1 | 91.3 | × | STRAND INVERSION BREAKAGE DUE TO OVER-COMPRESSION |
| COMPARATIVE EXAMPLE 5 | 0.303 | 0.55 | 0.238 | 0.193 | 81.1 | 91.2 | × | STRAND INVERSION BREAKAGE DUE TO OVER-COMPRESSION |
| COMPARATIVE EXAMPLE 6 | 0.313 | 0.57 | 0.255 | 0.206 | 80.6 | 91.9 | × | STRAND INVERSION BREAKAGE DUE TO OVER-COMPRESSION |
| COMPARATIVE EXAMPLE 7 | 0.303 | 0.56 | 0.246 | 0.196 | 79.4 | 91.2 | × | STRAND INVERSION BREAKAGE DUE TO OVER-COMPRESSION |
| COMPARATIVE EXAMPLE 8 | 0.303 | 0.57 | 0.255 | 0.199 | 77.8 | 91.4 | × | STRAND INVERSION BREAKAGE DUE TO OVER-COMPRESSION |

COMPRESSED STRANDED CONDUCTOR, METHOD OF MANUFACTURING COMPRESSED STRANDED CONDUCTOR, INSULATED ELECTRIC WIRE, AND WIRE HARNESS

CROSS-REFERENCE TO RELATED APPLICATION(S)

The present application is a divisional patent application claiming priority under 35 U.S.C. § 120 to U.S. application Ser. No. 17/458,555 filed on Aug. 27, 2021, which in turn claims priority under 35 U.S.C. § 119 to Japanese Patent Application No. 2020-144164 filed in Japan on Aug. 28, 2020, the entirety of which are incorporated by reference herein.

TECHNICAL FIELD

The present disclosure relates to a compressed stranded conductor, a method of manufacturing a compressed stranded conductor, an insulated electric wire, and a wire harness.

BACKGROUND ART

In the related art, in a method of manufacturing a compressed stranded conductor that twists and compresses a plurality of strands, for example, a technology is known in which strand inversion is suppressed by dividing the compression into plural times of split compression processes, in a case where the final compression ratio ((conductor cross-sectional area before compression-conductor cross-sectional area after compression)/conductor cross-sectional area before compression) is high (for example, refer to JP-A-2012-43720).

Here, the inventors have been studying compressed stranded conductors and found that the effect of preventing strand inversion could not be achieved simply by performing plural times of split compression processes. The inventors also found that, even when the strand inversion could be prevented, the strands might break.

SUMMARY

The present disclosure has been made to solve such a problem of the related art, and an object thereof is to provide a compressed stranded conductor, a method of manufacturing a compressed stranded conductor, an insulated electric wire, and a wire harness that can reduce the possibility of strand inversion and also reduce the possibility of strand breakage.

Aspect of non-limiting embodiments of the present disclosure relates to provide a compressed stranded conductor including:

- a central stranded wire having a plurality of conductive strands which are twisted together; and
- an outer circumferential stranded wire having a plurality of conductive strands which are twisted together at an outer circumference of the central stranded wire and disposed at the outer circumference of the central stranded wire as a layer, in which
- a composite stranded wire configured by the central stranded wire and the outer circumferential stranded wire is compressed, and an occupancy ratio of the composite stranded wire is 90.2% or more and 91.0% or less; and
- the occupancy ratio is a rate of a value obtained by dividing a weight of the composite stranded wire after compression and cut into 1 meter by a specific gravity of a conductor material of the composite stranded wire, with respect to a value obtained by multiplying a square of a conductor radius of the composite stranded wire after compression by $\pi$.

According to the present disclosure, the possibility of strand inversion can be reduced, and the possibility of strand breakage can also be reduced.

BRIEF DESCRIPTION OF DRAWINGS

FIG. 6 is a first table illustrating Examples and Comparative Examples.

FIG. 7 is a second table illustrating Examples and Comparative Examples.

DESCRIPTION OF EMBODIMENTS

Hereinafter, the present disclosure will be described in accordance with appropriate embodiments. The present disclosure is not limited to the embodiments which will be described hereinafter, and can be appropriately changed without departing from the spirit of the present disclosure. In addition, in the embodiments which will be described hereinafter, there is a part where illustration or description of a part of the configuration is omitted, but it is needless to say that appropriately known or well-known technology is employed as the omitted details of the technology within the range in which contradiction to the contents to be described hereinafter is not generated.

Figure 1:
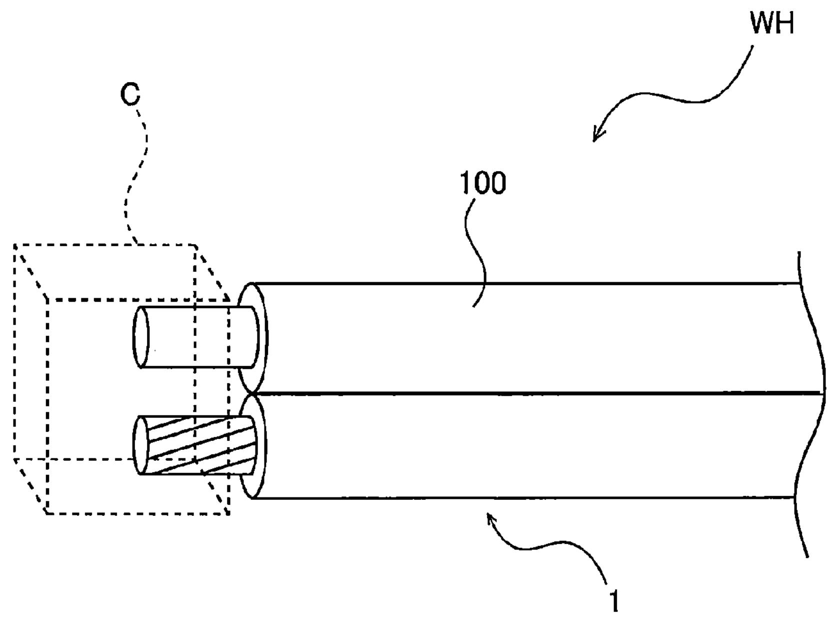
FIG. 1 is a configuration view illustrating an example of a wire harness including an insulated electric wire according to an embodiment of the present disclosure.

FIG. 1 is a configuration view illustrating an example of a wire harness including an insulated electric wire according to an embodiment of the present disclosure. As illustrated in FIG. 1, a wire harness WH includes an insulated electric wire 1, which will be described in detail below, and the other insulated electric wire (the other wire) 100.

In the insulated electric wire 1 and the other insulated electric wire 100, for example, terminals (not illustrated) are crimped or the like, and the terminals are accommodated in a terminal accommodation chamber of a connector C to make the wire harness WH. The insulated electric wire 1 and the other insulated electric wire 100 may be attached to or taped around an exterior member such as a corrugated tube (not illustrated). The wire harness WH may have two or more insulated electric wires 1 and two or more other insulated electric wires 100. The connector C is not essential for the wire harness WH.

Figure 2:
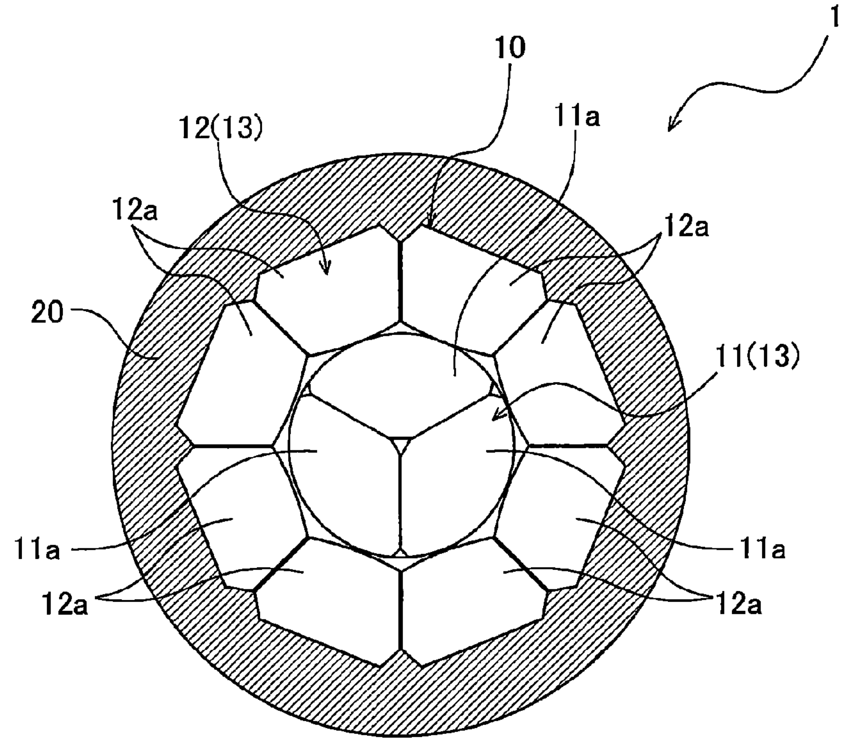
FIG. 2 is a structural view illustrating the insulated electric wire illustrated in FIG. 1.

FIG. 2 is a structural view illustrating the insulated electric wire 1 illustrated in FIG. 1. As illustrated in FIG. 2, the insulated electric wire 1 includes a compressed stranded conductor 10 and a covering portion 20 that covers the periphery of the compressed stranded conductor 10 obtained by the compression process.

The compressed stranded conductor 10 obtained by twisting and compressing a plurality of strands 11*a* and 12*a*. The compressed stranded conductor 10 has a central stranded wire 11 and an outer circumferential stranded wire 12. The central stranded wire 11 is obtained by twisting a plurality of conductive strands 11*a*. In this embodiment, the central stranded wire 11 is formed by twisting three strands 11*a* made of aluminum alloy. The strand 11*a* is not limited to aluminum alloy, but may also be made of aluminum, copper, copper alloy, and the like.

The central stranded wire 11 is compressed so that the occupancy ratio is 84.2% or more and 87.7% or less, for example. Here, the occupancy ratio is a value expressed by (the cross-sectional area of the conductor after compression/compression die hole area)×100(%). The cross-sectional area of the conductor after compression is calculated by the weight of the strand 11*a*/specific gravity of aluminum (in a case where the strand 11*a* is aluminum or aluminum alloy)× the number (three) of strands 11*a*. In a case where the strand 11*a* is copper or copper alloy, the specific gravity of copper is used instead of the specific gravity of aluminum. The compression die hole area is calculated from the hole diameter of the compression die actually used in the compression process.

In the outer circumferential stranded wire 12, a plurality of conductive strands 12*a* are twisted together at the outer circumference of the central stranded wire 11 and disposed as a layer. In this embodiment, the outer circumferential stranded wire 12 is formed by twisting eight strands 12*a* made of aluminum alloy. Similar to the strand 11*a* of the central stranded wire 11, the strand 12*a* is not limited to aluminum alloy, but may also be made of aluminum, copper, copper alloy, and the like. The outer circumferential stranded wire 12 may be formed in two or more layers.

Here, when the one in which the outer circumferential stranded wire 12 (regardless of before or after compression) is disposed at the outer circumference of the central stranded wire 11 (regardless of before or after compression) is called a composite stranded wire 13, the composite stranded wire 13 (after compression) is compressed by a compression die or the like. In particular, the composite stranded wire 13 is compressed so that the occupancy ratio is 90.2% or more and 91.0% or less. The definition of the occupancy ratio is the same as above, but in a case of compression without using a compression die or in a case of determining the occupancy ratio only from the composite stranded wire 13 after compression, the occupancy ratio may be an occupancy ratio, which is a rate of the value obtained by dividing the weight of the composite stranded wire 13 after compression and cut to 1 meter by the specific gravity of a conductive material (the conductive material that forms the central stranded wire 11 and the outer circumferential stranded wire 12) with respect to a value obtained by multiplying the square of the conductor radius of the composite stranded wire 13 after compression by π.

Figure 3:
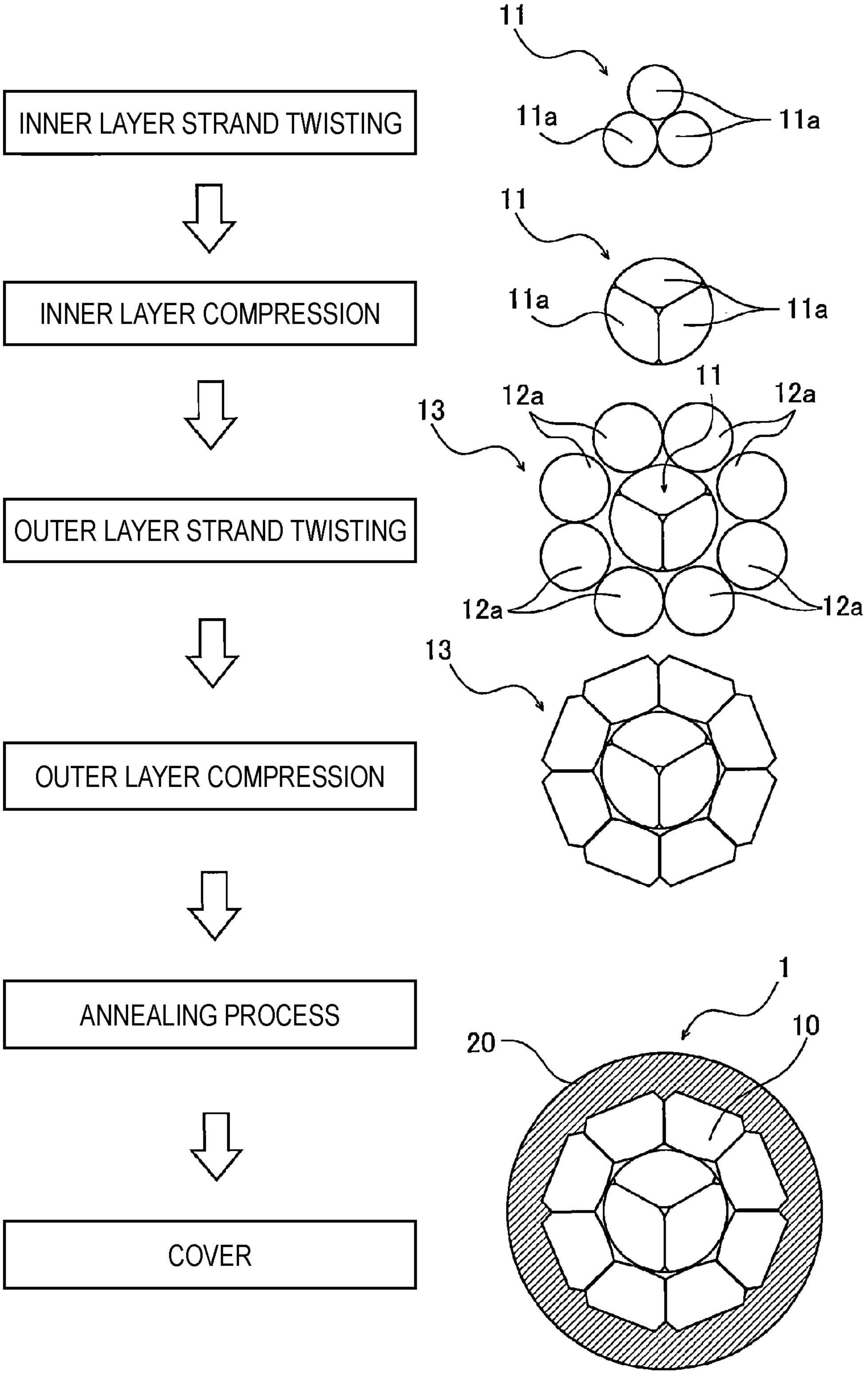
FIG. 3 is a process diagram illustrating a method of manufacturing the insulated electric wire illustrated in FIG. 2.

FIG. 3 is a process diagram illustrating a method of manufacturing the insulated electric wire illustrated in FIG. 2. As illustrated in FIG. 3, first, the inner layer strand twisting process is performed. In this process, a plurality (three) of strands 11*a* are twisted together to form the central stranded wire 11 before compression.

Next, the inner layer compression process is performed. In this process, for example, compression is performed by a first compression die. In this process, the first occupancy ratio, which is the ratio of the cross-sectional area of the central stranded wire 11 after compression with respect to the hole area of the first compression die, is set to 84.2% or more and 87.7% or less. Accordingly, the compressed central stranded wire 11 is obtained. As described above, the cross-sectional area of the central stranded wire 11 after compression is calculated by the weight of the strand 11*a*/the specific gravity of aluminum (in a case where the strand 11*a* is aluminum or aluminum alloy)×the number (three) of strands 11*a*.

Next, the outer layer strand twisting process is performed. In this process, a plurality (eight) of strands 12*a* are twisted together and disposed at the outer circumference of the central stranded wire 11 after compression. Accordingly, the composite stranded wire 13 is formed.

After this, the outer layer compression process is performed. In this process, for example, compression is performed by a second compression die. In this process, the second occupancy ratio, which is the ratio of the cross-sectional area of the composite stranded wire 13 after compression with respect to the hole area of the second compression die, is set to 90.2% or more and 91.0% or less. Accordingly, the compressed composite stranded wire 13 is obtained. Here, the cross-sectional area of the composite stranded wire 13 after compression is calculated by the weight of the strands 11*a* and 12*a*/the specific gravity of aluminum (in a case where the strands 11*a* and 12*a* are aluminum or aluminum alloy)×the number (eleven) of strands 11*a* and 12*a*.

Although the inner layer compression process and the outer layer compression process are each a single compression process, not being limited thereto, each compression process may be a step-by-step process using a plurality of compression dies.

Next, an annealing process is performed. In this process, the compressed composite stranded wire 13 is annealed at a predetermined temperature or higher for a predetermined time or longer. Accordingly, the compressed stranded conductor 10 is obtained. After this, the coating process is performed to obtain the insulated electric wire 1 in this embodiment.

Figures 4, 5:
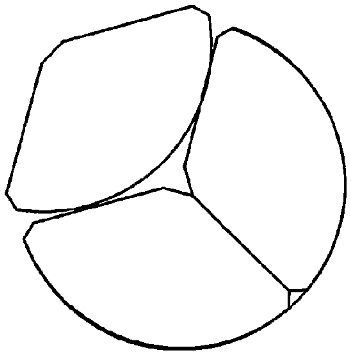
FIG. 4 is a view illustrating an example of an aspect of strand inversion.
FIG. 5 is a table illustrating details of strands that make a compressed stranded conductor according to Examples and Comparative Examples.

FIG. 4 is a view illustrating an example of an aspect of strand inversion. In the method of manufacturing the compressed stranded conductor 10 of this embodiment, since the above-described first occupancy ratio and the second occupancy ratio are used, it becomes difficult for strand inversion to occur as illustrated in FIG. 4. Hereinafter, the strand inversion and the strand breakage will be described with reference to the Examples and Comparative Examples below.

FIG. 5 is a table illustrating details of strands that make the compressed stranded conductor according to Examples and Comparative Examples. As illustrated in FIG. 5, the strands are made of aluminum alloy in the Examples and Comparative Examples. The aluminum alloy has Si of 0.10 mass % or less and Fe of 0.55 mass % or more and 0.65 mass % or less. The aluminum alloy has Mg of 0.28 mass % or more and 0.32 mass % or less, Zr of 0.005 mass % or more and 0.01 mass % or less, and Ti of is 0.02 mass % or less. These strands have a strand diameter of 0.303 mm or more and 0.322 mm or less, a strength of 250 MPa or more and 320 MPa or less, and an elongation of 1% or more and 3% or less.

FIGS. 6 and 7 are tables illustrating Examples and Comparative Examples. First, in Examples 1 to 6 and Comparative Examples 1 to 8, there were three inner layer strands (strands that form the central stranded wire) and eight outer layer strands (strands that make the outer circumferential stranded wire). The outer layer strand diameter is 0.322 mm, and the outer layer compression die diameter (the die diameter of the second compression die that compresses the composite stranded wire) is 1.02 mm.

In Example 1, the inner layer strand diameter is 0.303 mm, and the inner layer compression die diameter (the die diameter of the first compression die that compresses the central stranded wire) is 0.5 mm. The hole area of the inner layer compression die is 0.196 $mm^2$, and the inner layer conductor (central stranded wire) cross-sectional area after compression is 0.172 $mm^2$. The inner layer occupancy ratio (first occupancy ratio) is 87.7%, and the final occupancy ratio (second occupancy ratio) is 90.2%.

In Example 2, the inner layer strand diameter is 0.303 mm and the inner layer compression die diameter is 0.51 mm. The hole area of the inner layer compression die is 0.204 $mm^2$, and the inner layer conductor cross-sectional area after compression is 0.177 $mm^2$. The inner layer occupancy ratio is 86.9%, and the final occupancy ratio is 90.8%.

In Example 3, the inner layer strand diameter is 0.313 mm and the inner layer compression die diameter is 0.53 mm. The hole area of the inner layer compression die is 0.221 $mm^2$, and the inner layer conductor cross-sectional area after compression is 0.191 $mm^2$. The inner layer occupancy ratio is 86.5%, and the final occupancy ratio is 91.0%.

In Example 4, the inner layer strand diameter is 0.303 mm and the inner layer compression die diameter is 0.52 mm. The hole area of the inner layer compression die is 0.212 $mm^2$, and the inner layer conductor cross-sectional area after compression is 0.182 $mm^2$. The inner layer occupancy ratio is 85.5%, and the final occupancy ratio is 90.2%.

In Example 5, the inner layer strand diameter is 0.322 mm and the inner layer compression die diameter is 0.56 mm. The hole area of the inner layer compression die is 0.246 $mm^2$, and the inner layer conductor cross-sectional area after compression is 0.209 $mm^2$. The inner layer occupancy ratio is 84.9%, and the final occupancy ratio is 91.0%.

In Example 6, the inner layer strand diameter is 0.303 mm and the inner layer compression die diameter is 0.53 mm. The hole area of the inner layer compression die is 0.221 $mm^2$, and the inner layer conductor cross-sectional area after compression is 0.186 $mm^2$. The inner layer occupancy ratio is 84.2%, and the final occupancy ratio is 91.0%.

In Comparative Example 1, the inner layer strand diameter is 0.303 mm and the inner layer compression die diameter is 0.49 mm. The hole area of the inner layer compression die is 0.189 $mm^2$, and the inner layer conductor cross-sectional area after compression is 0.167 $mm^2$. The inner layer occupancy ratio is 88.5%, and the final occupancy ratio is 90.1%.

In Comparative Example 2, the inner layer strand diameter is 0.313 mm and the inner layer compression die diameter is 0.55 mm. The hole area of the inner layer compression die is 0.238 $mm^2$, and the inner layer conductor cross-sectional area after compression is 0.199 $mm^2$. The inner layer occupancy ratio is 83.7%, and the final occupancy ratio is 91.6%.

In Comparative Example 3, the inner layer strand diameter is 0.303 mm and the inner layer compression die diameter is 0.54 mm. The hole area of the inner layer compression die is 0.229 $mm^2$, and the inner layer conductor cross-sectional area after compression is 0.190 $mm^2$. The inner layer occupancy ratio is 82.8%, and the final occupancy ratio is 91.2%.

In Comparative Example 4, the inner layer strand diameter is 0.313 mm and the inner layer compression die diameter is 0.56 mm. The hole area of the inner layer compression die is 0.246 $mm^2$, and the inner layer conductor cross-sectional area after compression is 0.202 $mm^2$. The inner layer occupancy ratio is 82.1%, and the final occupancy ratio is 91.3%.

In Comparative Example 5, the inner layer strand diameter is 0.303 mm and the inner layer compression die diameter is 0.55 mm. The hole area of the inner layer compression die is 0.238 $mm^2$, and the inner layer conductor cross-sectional area after compression is 0.193 $mm^2$. The inner layer occupancy ratio is 81.1%, and the final occupancy ratio is 91.2%.

In Comparative Example 6, the inner layer strand diameter is 0.313 mm and the inner layer compression die diameter is 0.57 mm. The hole area of the inner layer compression die is 0.255 $mm^2$, and the inner layer conductor cross-sectional area after compression is 0.206 $mm^2$. The inner layer occupancy ratio is 80.6%, and the final occupancy ratio is 91.9%.

In Comparative Example 7, the inner layer strand diameter is 0.303 mm and the inner layer compression die diameter is 0.56 mm. The hole area of the inner layer compression die is 0.246 $mm^2$, and the inner layer conductor cross-sectional area after compression is 0.196 $mm^2$. The inner layer occupancy ratio is 79.4%, and the final occupancy ratio is 91.2%.

In Comparative Example 8, the inner layer strand diameter is 0.303 mm and the inner layer compression die diameter is 0.57 mm. The hole area of the inner layer compression die is 0.255 $mm^2$, and the inner layer conductor cross-sectional area after compression is 0.199 $mm^2$. The inner layer occupancy ratio is 77.8%, and the final occupancy ratio is 91.4%.

For the above-described Examples 1 to 6, the final occupancy ratio is 90.2% or more and 91.0% or less. As a result, no strand breakage occurs particularly on the outer layer of the composite stranded wire (compressed stranded conductor), and no strand inversion occurs.

In contrast, for Comparative Example 1, the final occupancy ratio is 90.1%, which is lower than 90.2%. Therefore, over-compression is achieved, and strand breakage is confirmed particularly on the outer layer of the composite stranded wire (compressed stranded conductor). For Comparative Examples 2 to 8, the final occupancy ratio is 91.2% or more and 91.9% or less, which is higher than 91.0%. As a result, the compression is weak, and strand inversion is confirmed particularly on the outer layer of the composite stranded wire (compressed stranded conductor).

In addition, the inner layer occupancy ratio is 84.2% or more and 87.7% or less for Examples 1 to 6 as described above. Therefore, no strand breakage occurs in the central stranded wire, and no strand inversion occurs.

In contrast, for Comparative Example 1, the inner layer occupancy ratio is 88.5%, which is higher than 87.7%. As a result, compression is weak and strand inversion is confirmed in the central stranded wire. For Comparative Examples 2 to 8, the inner layer occupancy ratio is 77.8% or more and 83.7% or less, which is lower than 84.2%. Therefore, over-compression is achieved and strand breakage is confirmed in the central stranded wire.

From the above, it is found that, when the inner layer occupancy ratio is 84.2% or more and 87.7% or less and the final occupancy ratio is 90.2% or more and 91.0% or less, in both the central stranded wire and the composite stranded wire, the strand breakage and the strand inversion can be suppressed.

In the above, as described above, the compressed stranded conductor has a two-layered structure including the central stranded wire and the outer circumferential stranded wire, but not being limited thereto, and a three-layered structure may also be employed. Although the drawings are not particularly illustrated, it is also confirmed that, when the final occupancy ratio in the compressed stranded conductor having a three-layer structure is 90.2% or more and 91.0% or less, as described above, occurrence of the strand breakage and occurrence of the strand inversion are suppressed particularly on the outer layer of the composite stranded wire.

As described above, in Examples 1 to 6, the inner layer occupancy ratio is 84.2% or more and 87.7% or less, and no breakage due to over-compression occurs even though the final occupancy ratio is below the lower limit of 90.2%. This is because the deformation behavior during compression is different between the central stranded wire and the outer circumferential stranded wire.

In this manner, according to the compressed stranded conductor 10, the insulated electric wire 1, and the wire harness WH of the present embodiment, the central stranded wire 11 and the outer circumferential stranded wire 12 are compressed, and the occupancy ratio is 90.2% or more and 91.0% or less. Here, the inventors found that, when the occupancy ratio is below 90.2%, over-compression occurs and strand breakage occurs. The inventors also found that, when the occupancy ratio exceeds 91.0%, the compression is extremely weak and strand inversion occurs. Accordingly, by setting the occupancy ratio to be 90.2% or more and 91.0% or less, the possibility of strand inversion can be reduced, and the possibility of strand breakage can also be reduced.

In the method of manufacturing the compressed stranded conductor 10 according to this embodiment, the inventors have found that the possibility of strand inversion and grandchild wire breakage can be further reduced for the central stranded wire by setting the first occupancy ratio to be 84.2% or more and 87.7% or less. Accordingly, by setting the first occupancy ratio to be 84.2% or more and 87.7% or less, and then, by setting the second occupancy ratio to be 90.2% or more and 91.0% or less, the possibility of strand inversion can be further reduced, and the possibility of strand breakage can also be further reduced.

Above, although the present disclosure is described based on the embodiments, the present disclosure is not limited to the above-described embodiments, and modifications may be made without departing from the spirit of the present disclosure, or an appropriately known or well-known technologies may be combined.

For example, the central stranded wire 11 according to this embodiment is made of, for example, three strands 11*a*, and the outer circumferential stranded wire 12 is made of, for example, eight strands 12*a*, but the number of strands is not limited thereto.

In the above-described embodiment, the compressed stranded conductor 10 compresses the central stranded wire 11 once and the composite stranded wire 13 once, but this is not limited thereto, and the central stranded wire 11 or the composite stranded wire 13 may be compressed plural times. Furthermore, if possible, the process of compressing the central stranded wire 11 alone is not provided, and one or more compressions may be performed on the composite stranded wire 13 obtained by disposing the outer circumferential stranded wire 12 on the uncompressed central stranded wire 11 to achieve the above-described occupancy ratio.

Hereinafter, the embodiments of the present disclosure are summarized.

Aspect of non-limiting embodiments of the present disclosure relates to provide a compressed stranded conductor including:

a central stranded wire having a plurality of conductive strands which are twisted together; and an outer circumferential stranded wire having a plurality of conductive strands which are twisted together at an outer circumference of the central stranded wire and disposed at the outer circumference of the central stranded wire as a layer, in which a composite stranded wire configured by the central stranded wire and the outer circumferential stranded wire is compressed, and an occupancy ratio of the composite stranded wire is 90.2% or more and 91.0% or less; and the occupancy ratio is a rate of a value obtained by dividing a weight of the composite stranded wire after compression and cut into 1 meter by a specific gravity of a conductor material of the composite stranded wire, with respect to a value obtained by multiplying a square of a conductor radius of the composite stranded wire after compression by $\pi$.

Aspect of non-limiting embodiments of the present disclosure relates to provide a method of manufacturing a compressed stranded conductor that compresses a central stranded wire having a plurality of conductive strands which are twisted together, and an outer circumferential stranded wire having a plurality of conductive strands which are twisted together at an outer circumference of the central stranded wire and disposed at the outer circumference of the central stranded wire as a layer, by a compression die, the method including:

a first compression process of compressing the central stranded wire with a first compression die to set a first occupancy ratio to be 84.2% or more and 87.7% or less, in which the first occupancy ratio is a ratio of a cross-sectional area of the central stranded wire after compression with respect to a hole area of the first compression die; and a second compression process of compressing a composite stranded wire, in which the outer circumferential stranded wire is disposed at an outer circumference of the central stranded wire, with a second compression die to set a second occupancy ratio to be 90.2% or more and 91.0% or less, in which the second occupancy ratio is a ratio of a cross-sectional area of the composite stranded wire after compression with respect to a hole area of the second compression die.

Aspect of non-limiting embodiments of the present disclosure relates to provide an insulated electric wire including:

the compressed stranded conductor according to the above; and an insulating covering portion that covers a periphery of the compressed stranded conductor.

Aspect of non-limiting embodiments of the present disclosure relates to provide a wire harness including:

the insulated electric wire according to the above; and other electric wire disposed along the insulated electric wire.

What is claimed is:

1. A method of manufacturing a compressed stranded conductor that compresses a central stranded wire having a plurality of conductive strands which are twisted together, and an outer circumferential stranded wire having a plurality of conductive strands which are twisted together at an outer circumference of the central stranded wire and disposed at the outer circumference of the central stranded wire as a layer, the method comprising:

a first compression process of compressing the central stranded wire with a first compression die to set a first occupancy ratio to be 84.2% or more and 87.7% or less, wherein the first compression die has a first hole having a first cross-sectional area, wherein the first occupancy ratio is a ratio of a cross-sectional area of the central stranded wire after compression with respect to the first cross-sectional area of the first hole of the first compression die; and a second compression process of compressing a composite stranded wire, in which the outer circumferential stranded wire is disposed at an outer circumference of the central stranded wire, with a second compression die to set a second occupancy ration to be 90.2% or more and 91.0 or less, wherein the second compression dies has a second hole having a second cross-sectional area, wherein the second occupancy ratio of a cross-sectional area of the composite stranded wire after compression with respect to the second cross-sectional area of the second hole of the second compression die.

* * * * *